(12) United States Patent
Do et al.

(10) Patent No.: US 12,073,031 B2
(45) Date of Patent: Aug. 27, 2024

(54) METHOD FOR PHOTOGRAPHING IN MULTIPLE DIRECTIONS THROUGH ONE CAMERA AND ELECTRONIC DEVICE THEREOF

(71) Applicant: Samsung Electronics Co., Ltd., Suwon-si (KR)

(72) Inventors: Wonjoon Do, Suwon-si (KR); Woojhon Choi, Suwon-si (KR); Jaesung Choi, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/070,763

(22) Filed: Nov. 29, 2022

(65) Prior Publication Data

US 2023/0086383 A1    Mar. 23, 2023

Related U.S. Application Data

(63) Continuation of application No. PCT/KR2022/008786, filed on Jun. 21, 2022.

(30) Foreign Application Priority Data

Jun. 21, 2021    (KR) .................. 10-2021-0080238

(51) Int. Cl.
*G06F 3/0354*    (2013.01)
*H04N 7/18*    (2006.01)
*H04N 19/597*    (2014.01)

(52) U.S. Cl.
CPC ......... *G06F 3/03545* (2013.01); *H04N 7/181* (2013.01); *H04N 19/597* (2014.11)

(58) Field of Classification Search
CPC ... G06F 3/03545; H04N 19/597; H04N 7/181
See application file for complete search history.

(56) References Cited

U.S. PATENT DOCUMENTS 8,847,860 B2    9/2014   Nakamura et al.
10,198,649 B2   2/2019   Lee et al.
(Continued)

FOREIGN PATENT DOCUMENTS

CN    110739339 A    1/2020
CN    210668382 U    6/2020
(Continued)

*Primary Examiner* — Hang Lin
(74) *Attorney, Agent, or Firm* — Jefferson IP Law, LLP

(57) ABSTRACT

An electronic device is provided. The electronic device includes a housing, the housing including an opening formed on a portion thereof and an internal space extending from the opening into the housing, a first wireless communication circuit, a display including a first area, an electronic pen insertable into the internal space through the opening and including a camera and a second wireless communication circuit, the camera of the electronic pen being positioned at a point corresponding to the first area when the electronic pen is inserted into the internal space of the housing, and at least one processor connected to the first wireless communication circuit, the display and the electronic pen, and configured to obtain image data obtained by the camera included in the electronic pen through the first wireless communication circuit and output the obtained image data through the display.

17 Claims, 11 Drawing Sheets

(56) References Cited

U.S. PATENT DOCUMENTS

| | | |
|---|---|---|
| 11,082,547 B2 | 8/2021 | Xu et al. |
| 11,146,745 B2 | 10/2021 | Siala et al. |
| 2007/0279711 A1 | 12/2007 | King et al. |
| 2010/0081479 A1 | 4/2010 | Lee et al. |
| 2011/0117958 A1 | 5/2011 | Kim et al. |
| 2013/0201162 A1 | 8/2013 | Cavilia |
| 2014/0152576 A1 | 6/2014 | Kim et al. |
| 2020/0160775 A1 | 5/2020 | Zhang et al. |
| 2021/0124434 A1* | 4/2021 | Bakema ............... G06F 3/038 |
| 2021/0408496 A1* | 12/2021 | Choi ................ H10K 50/86 |
| 2022/0005883 A1 | 1/2022 | Zhang |

FOREIGN PATENT DOCUMENTS

| | | |
|---|---|---|
| JP | 10-93671 A | 4/1998 |
| KR | 10-0461769 B1 | 12/2004 |
| KR | 10-2008-0109342 A | 12/2008 |
| KR | 10-2010-0036741 A | 4/2010 |
| KR | 10-2011-0056816 A | 5/2011 |
| KR | 10-2014-0046327 A | 4/2014 |
| KR | 10-2017-0054877 A | 5/2017 |
| KR | 10-2017-0101732 A | 9/2017 |
| KR | 10-2020-0014408 A | 2/2020 |
| WO | 2019/085185 A1 | 5/2019 |

* cited by examiner

METHOD FOR PHOTOGRAPHING IN MULTIPLE DIRECTIONS THROUGH ONE CAMERA AND ELECTRONIC DEVICE THEREOF

CROSS-REFERENCE TO RELATED APPLICATION(S)

This application is a continuation application, claiming priority under § 365(c), of an International application No. PCT/KR2022/008786, filed on Jun. 21, 2022, which is based on and claims the benefit of a Korean patent application number 10-2021-0080238, filed on Jun. 21, 2021, in the Korean Intellectual Property Office, the disclosure of which is incorporated by reference herein in its entirety.

TECHNICAL FIELD

The disclosure relates to a method for performing photography in multiple directions through a single camera, and an electronic device therefor.

BACKGROUND ART

Recently, portable electronic devices such as smartphones and tablet PCs are equipped with electronic pens so as to satisfy various user demands and to improve convenience. In addition, in order to reduce the possibility of loss resulting from separation between portable electronic devices and electronic pens, electronic pens have been designed to be inserted and contained inside portable electronic devices, or to be attached to one side surface of portable electronic devices by using magnets.

In addition, a portable electronic device may use front and rear cameras to capture images in the forward/backward directions. In connection with capturing images in the forward or backward direction of the electronic device by using multiple cameras, a portable electronic device may use camera modules having different specifications.

The above information is presented as background information only to assist with an understanding of the disclosure. No determination has been made, and no assertion is made, as to whether any of the above might be applicable as prior art with regard to the disclosure.

DISCLOSURE

Technical Problem

Portable electronic devices are equipped with camera modules, which are required to have a high level of performance and to have various functions, and the size of camera modules is gradually increasing as a result. However, portable electronic devices are required to have small thicknesses for portability and usability of the electronic devices, thereby placing restrictions on increasing the size of camera modules while maintaining the performance of the camera modules. Furthermore, in connection with equipping portable electronic devices with camera modules, front and rear cameras having different performances are both mounted, for multidirectional photography, according to the level of importance and usability. Equipping a single portable electronic device with two or more camera modules in this manner may cause not only spatial loss, but also cost-related loss.

Aspects of the disclosure are to address at least the above-mentioned problems and/or disadvantages and to provide at least the advantages described below. Accordingly, an aspect of the disclosure is to provide an electronic device and a method for controlling an electronic device, wherein a camera is mounted on an electronic pen used for a portable electronic device such that the electronic pen is used to remotely capture images, or the electronic pen is inserted into the electronic device and used as a front camera or a rear camera depending on the direction of insertion.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing, including an opening formed on a portion thereof and an internal space extending from the opening into the housing, a first wireless communication circuit, a display including a first area having a first light transmittance a second area other than the first area of the display having a second light transmittance lower than the first transmittance, an electronic pen insertable into the internal space through the opening and including a camera being positioned at a point corresponding to the first area of the display when the electronic pen is inserted into the internal space of the housing and a second wireless communication circuit, and at least one processor operatively connected to the first wireless communication circuit, the display, and the electronic pen, wherein the at least one processor is configured to obtain image data obtained by the camera included in the electronic pen through the first wireless communication circuit, and output the obtained image data through the display.

In accordance with another aspect of the disclosure, a method for operating an electronic device is provided. The method includes obtaining image data obtained by a camera included in an electronic pen through a first wireless communication circuit, and outputting the obtained image data through a display.

In accordance with another aspect of the disclosure, an electronic device is provided. The electronic device includes a display including a first area of the display having a first light transmittance and a second area other than the first area of the display having a second light transmittance lower than the first light transmittance, a camera movable in the electronic device, the camera being positioned at a point corresponding to the first area, and at least one processor operatively connected to the display and the camera, wherein the at least one processor is configured to determine an arrangement state of the camera in response to a user input of the electronic device, arrange the camera to be in the arrangement state based on the determination, and output image data obtained by the camera through the display.

Advantageous Effects

According to various embodiments disclosed herein, a single camera may be used to capture images in multiple directions.

In addition, according to various embodiments, since a single camera is used to capture images in multiple directions, the number of camera sensors may be reduced, thereby reducing the electronic device manufacturing cost.

In addition, according to various embodiments, while an electronic device and an electronic pen remain separated from each other, a camera mounted on the electronic pen may be used to remotely capture images.

Other aspects, advantageous and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
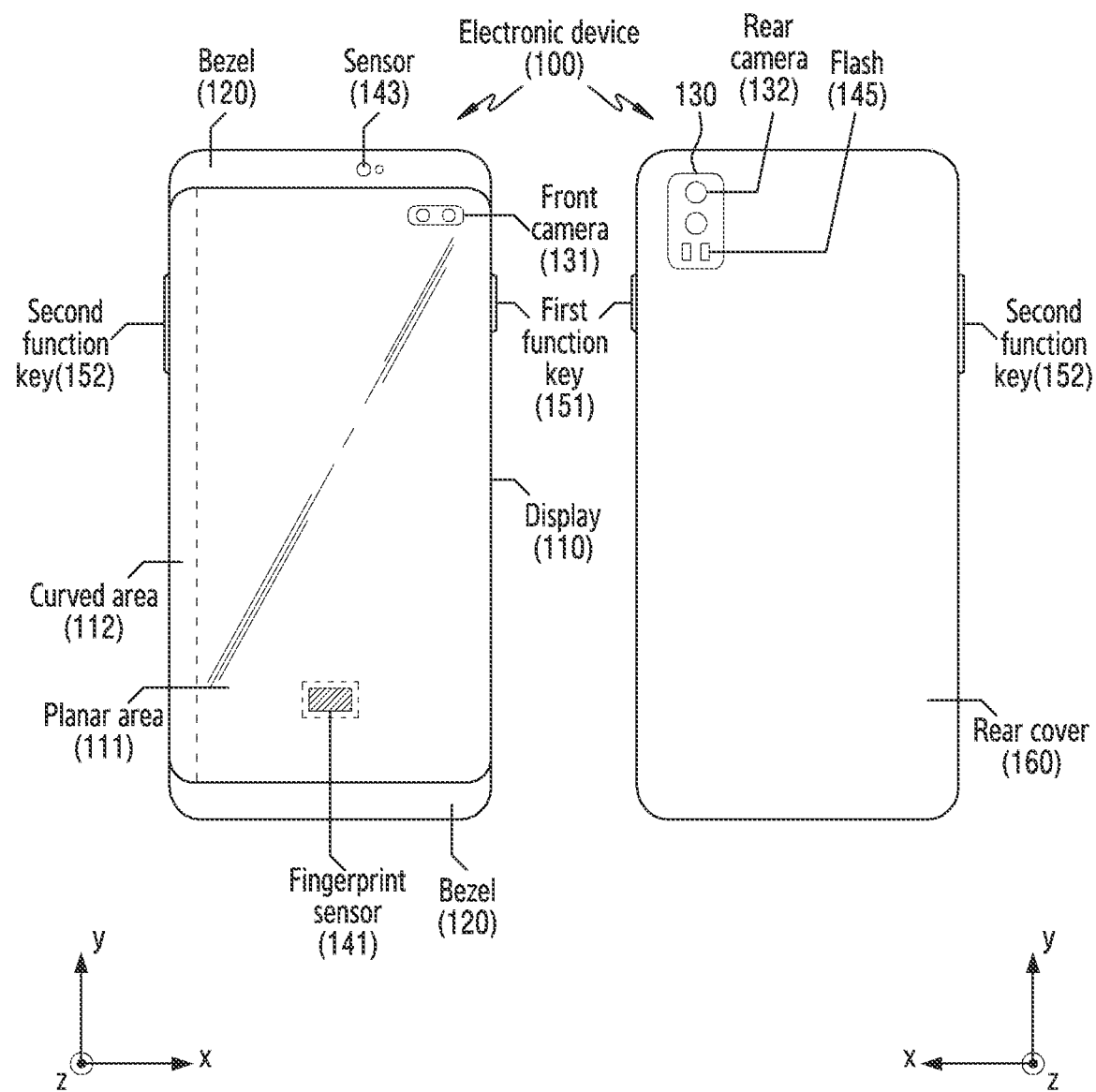
FIG. 1 shows an electronic device according to an embodiment of the disclosure.

FIG. 1 shows an electronic device according to an embodiment of the disclosure.

Referring to FIG. 1, a display 110 may be disposed on a front surface of the electronic device 100. The display 110 may occupy most of the front surface of the electronic device 100. The display 110 and a bezel 120 area configured to surround at least a partial edge of the display 110 may be disposed on the front surface of the electronic device 100. In the embodiment illustrated in FIG. 1, the display 110 may include a flat area 111 and a curved area 112 extending from the flat area 111 to a lateral side of the electronic device 100. Although FIG. 1 shows the curved area 112 on only one side (e.g., a left side), it may be understood that the curved area may also be formed on the opposite side. In addition, the electronic device 100 shown in FIG. 1 is merely one embodiment and various additional embodiments are possible. For example, the display 110 of the electronic device 100 may include the flat area 111 without the curved area 112 or may include the curved area 112 on only one side edge rather than both side edges. Furthermore, the curved area may extend to a rear surface of the electronic device 100 so that the electronic device 100 may include an additional flat area.

In an embodiment, a fingerprint sensor 141 for recognizing a user fingerprint may be included on a first area of the display 110. The fingerprint sensor 141 may be disposed on a layer under the display 110 so that the sensor may not be recognized or may be difficult to be recognized by the user. In addition, a sensor rather than the fingerprint sensor 141 for additional user/biometric authentication may be disposed on a partial area of the display 110. In another embodiment, the sensor for user/biometric authentication may be disposed on one area of the bezel 120. For example, an IR sensor for iris authentication may be exposed through one area of the display 110 or one area of the bezel 120.

In an embodiment, a front camera 131 may be disposed on a front surface of the electronic device 100. The embodiment in FIG. 1 shows that the front camera 141 is exposed through one area of the display 110, but the front camera 141 may be exposed through the bezel 120 in another embodiment.

The electronic device 100 may include one or more front camera 131. For example, the electronic device 100 may include two front cameras such as a first front camera and a second front camera. The first front camera and the second front camera may cameras of the same type having equivalent specifications (e.g., a pixel) or the first front camera and the second front camera may be implemented as cameras having different specifications. The electronic device 100 may support a function (e.g., 3D photographing, auto focusing (AF), etc.) related to a dual camera through the two front cameras.

A rear camera 132 may be disposed on a rear surface of the electronic device 100. The rear camera 132 may be exposed through a partial area of a rear cover 160. The electronic device 100 may include multiple rear cameras arranged on the partial area. The electronic device 100 may include two or more rear cameras. The electronic device 100 may include a first rear camera, a second rear camera, and a third rear camera. The first rear camera, the second rear camera, and the third rear camera may have different specifications. For example, the first rear camera, the second rear camera, and/or the third rear camera may be different in terms of FOV, pixels, apertures, whether to support a optical zoom/digital zoom, whether to support an image stabilization function, kinds and arrangement of lens set included in each camera, and the like. For example, the first rear camera may be an ordinary camera, and the second rear camera may be a camera for wide photographing, and the third rear camera may be a camera for telephotographing. In the disclosure, the description about the function or characteristics of the front camera may be applied to the rear camera, and vice versa.

Various hardware such as a flash 145 for assisting with photographing or a sensor may be additionally disposed on one area 130. For example, a distance sensor (e.g., a time of flight (TOF) sensor) for detecting a distance between a subject and the electronic device 100 or the like may be further included.

At least one physical key may be disposed on a lateral side of the electronic device 100. For example, a first function key 151 configured to turn the display ON/OFF or turn the power of the electronic device 100 ON/OFF may be disposed on a right edge with reference to the front surface of the electronic device 100. A second function key 152 configured to control a volume or screen brightness of the electronic device 100 may be disposed on a left edge with reference to the front surface of the electronic device 100. In addition, an additional button or key may be disposed on the front surface or the rear surface of the electronic device 100. For example, a physical button or a touch button mapped to a specific function may be disposed on a lower end area of the bezel 120 on the front surface.

The electronic device 100 shown in FIG. 1 is merely an embodiment and does not limit the type of device to which the technical idea disclosed herein is applied. For example, by employing a flexible display 110 or a hinge structure, the technical idea of the disclosure may be applied to a foldable electronic device capable of folding in a horizontal direction or vertical direction, a tablet computer, or a laptop computer. In addition, the technical idea of the disclosure may be applied to a case in which a first camera module and a second camera module facing the same direction may be disposed to face different directions by rotation, folding, deformation, or the like of a device.

In an embodiment, the electronic device 100 may include a rotatable camera module. A processor 101 of the electronic device 100 may dispose a camera to face the front of the electronic device 100. For example, the processor 101 may rotate a lens of a camera module to face the front of the electronic device 100 in response to a user input for photographing the front direction of the electronic device 100. A processor 101 of the electronic device 100 may dispose a camera module to face the rear of the electronic device 100. For example, the processor 101 may rotate a lens of a camera module to face the rear of the electronic device 100 in response to a user input for photographing the rear direction of the electronic device 100.

At least a partial component of the rotatable camera module may move. For example, with a lens assembly of a camera module and an image sensor as one set, the lens assembly and the image sensor may be rotated so that the lens assembly faces the front or the rear of the electronic device. In an embodiment, when the camera module is an L-shape camera module including a prism, the electronic device 100 may change a direction of the prism. The camera module may be used as a front camera or a rear camera by changing the direction of the prism.

Figure 2:
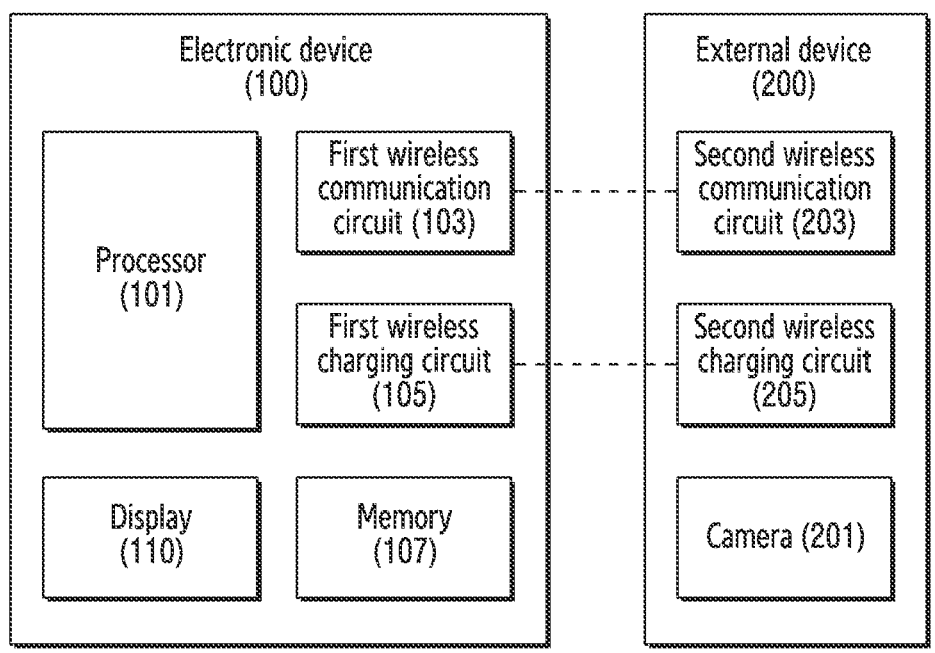
FIG. 2 shows main components of an electronic device and main components of an external device (e.g., an electronic pen) according to an embodiment of the disclosure.

FIG. 2 shows main components of an electronic device 100 and main components of an external device 200 (e.g., an electronic pen) according to an embodiment of the disclosure.

Referring to FIG. 2, the electronic device 100 may include a processor 101, a first wireless communication circuit 103, a first charging circuit 105, and a display 110. The processor 101 may be electrically or operatively connected to the first wireless communication circuit 103, the first charging circuit 105, and the display 110.

The external device 200 may include a camera 201, a second wireless communication circuit 203, a second charging circuit 205. The second wireless communication circuit 203 may be operatively connected to the first wireless communication circuit 103. The electronic device 100 may transmit or receive data to or from the external device 200. For example, the electronic device 100 may receive, through the first wireless communication circuit 103, data with respect to an input obtained through a button of the external device 200. The electronic device 100 may receive, through the first wireless communication circuit 103, image data obtained through the camera 201 mounted to external device 200.

In an embodiment, the electronic device 100 may charge a battery of the external device 200 by using power charged in a battery (e.g., the battery 989 in FIG. 9) of the electronic device 100. The external device 200 may be charged through the electronic device 100. The external device 200 may be charged while being attached to a lateral side of the electronic device 100. The external device 200 may be charged while being inserted into at least a portion of the electronic device 100. Other components for charging in FIG. 2 may be omitted. For example, each of the electronic device 100 and the external device 200 may include a charging coil and a pogo pin for charging. It is apparent at the level of a person skilled in the art that a component such as a sensor may be included.

The external device 200 may obtain image data through the camera 201. The camera 210 may include at least one lens (e.g., the lens assembly 1010 in FIG. 10), a color filter array, and/or an image sensor (e.g., the image sensor 1030 in FIG. 10). The external device 200 may include at least one lens (e.g., the lens assembly 1010 in FIG. 10), a flash (e.g., the flash 1020 in FIG. 10), an image sensor (e.g., the image sensor 1030 in FIG. 10), and/or an image stabilizer while not including an image signal processor (e.g., the image signal processor 1060 in FIG. 10) included in a general camera module (e.g., the camera module 980 in FIG. 9) to be responsible for image processing. The image signal processor (e.g., the image signal processor 1060 in FIG. 10) for processing image data obtained through the image sensor 1030 may be included in the electronic device 100. The camera 201 may collect light through at least one lens. The light obtained through the at least one lens may be transferred to the image sensor. The external device 200 may transmit, to the electronic device 100, image data on which imaging processing has not been performed.

The external device 200 may include an image signal processor (ISP), and may perform image processing with respect to image data obtained through the camera 201. The external device 200 may transmit, to the electronic device 100, image data on which imaging processing has been performed.

The processor 101 may execute/control various functions supported by the electronic device 100. For example, the processor 101 may execute an application by executing a code written in a programing language and stored in the memory 107, and control various hardware. The processor 101 may execute an application for supporting a photographing function and stored the memory 107. In addition, the processor 101 may execute the camera 201 through the wireless communication circuit 103 and 203, and may configure and support an appropriate photograph mode for the camera 201 to perform an operation intended a user.

An application related to the camera module 180 may be stored in the memory 107. For example, a camera application may be stored in the memory 107. The camera application may support various photograph functions such as still photographing, video photographing, panoramic photographing, slow motion photographing.

The processor 101 may display, on the display 110, an execution screen of an application executed by the processor 101 or content such as an image and/or a video stored in the memory 107. The display 110 may display image data stored in the memory 107 (e.g., a display buffer) on a display screen under the control of the processor 101. Furthermore, the processor 101 may display image data obtained through the camera 201 on the display 110 in real time.

Figure 3:
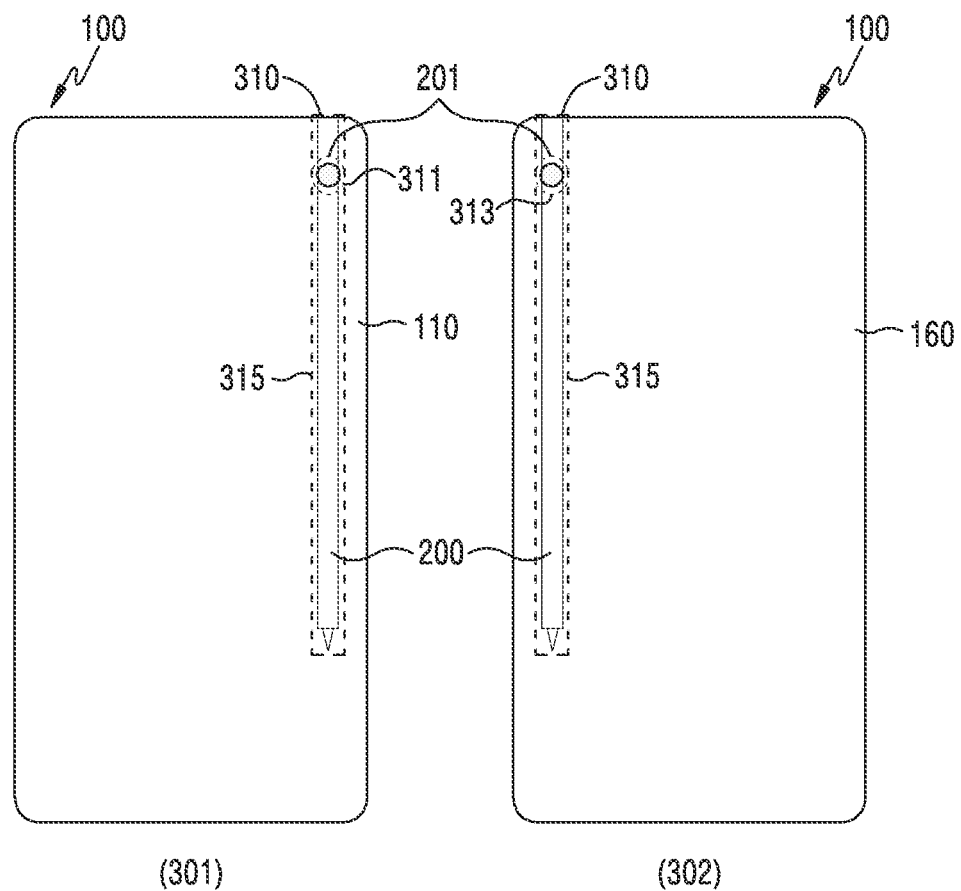
FIG. 3 shows an electronic device and an external device (e.g., an electronic pen) inserted into the electronic device according to an embodiment of the disclosure.

FIG. 3 shows an electronic device and an external device (e.g., an electronic pen) inserted into the electronic device according to an embodiment of the disclosure.

Referring to FIG. 3, a front surface 301 of the electronic device 100 and a rear surface 302 of the electronic device 100 are shown.

The electronic device 100 may include an opening 310 of a recess 315 at one side of the electronic device 100. For example, the opening 310 may be formed at the upper lateral surface of the electronic device 100.

In an embodiment, the electronic device 100 may include multiple openings. The electronic device 100 may include multiple openings so that an external device 200 (e.g., an electronic pen) is mounted to the electronic device 100 through the multiple openings.

The opening 310 may have at least one shape. For example, the opening 310 may have a circular shape or a polygonal shape with at least one angle. The opening 310 may have a shape similar a sectional shape of the external device 200 to allow the external device 200 (e.g., an electronic pen) to be inserted thereinto.

The external device 200 (e.g., an electronic pen) may be inserted into the electronic device 100. The camera 201 included in the external device 200 may be inserted to face the front direction (e.g., +z direction) or the rear direction (e.g., −z direction) of the electronic device 100.

The camera 201 may be disposed at the lower portion of the display 110. The camera 201 may be disposed on the rear surface (e.g., a surface facing −z direction) of a first area 311 of the display 110 to face the front direction (e.g., +z direction) of the electronic device 100. The camera 201 may be not exposed through the first area 311 and may include an under-display camera (UDC). The first area 311 may be referred to as an under-display camera (UDC) area.

According to an embodiment, the first area 311 of the display 110 faces at least a portion of the camera 201 and corresponds to a portion of an area for displaying a content, and may be formed to be a transmission area having a predetermined transmittance. The penetration area may be configured to have transmittance in the range of about 5% to about 20%. The transmission area of the display 110 may include an area having a lower pixel density and/or wire density than a peripheral area.

The quality of a captured image may be decreased because the camera 201 is disposed at the lower portion of the display 110. In order to prevent the quality of the image from decreasing, fewer pixels may be arranged on the first area 311. The pixel density of the first area 311 may be different from that of a second area of the display 110, which is a peripheral area. The pixel density of the first area 311 may be configured to be lower than that of the second area. For example, the number of pixels arranged on the first area 311 may be ½, ⅓, ¼, ⅕, or ⅙ of the number of pixels of the second area. Pixels are arranged on ½, ⅓, ¼, ⅕, or ⅙ of the total area of the first area, and the remaining area may be configured as an empty area (or a non-pixel area) without pixels. The first area 311 may have higher transparency than remaining area of the display.

A circuit area may be formed in an area surrounding the first area 311. For example, the circuit area may be formed between the first area 311 and the second area. When the first area 311 has a circular shape, the circuit area may be an area surrounding the circular first area 311 and the surrounding shape may be a circular shape, but is not limited thereto. In addition, an outer area of the first area 311 and the circuit area in the display 110 may be formed as the second area. The circuit area may include at least a driving circuit for driving the first area 311 and may have pixels arranged on a partial area thereof. In this case, the driving circuit may not be included in the first area 311. The driving circuit may be formed in a lower proportion compared to the pixels in the first area 311, the driving circuit may be formed in a higher proportion compared to the pixels in the circuit area, and the driving circuit may be formed in the same proportion as the pixels in the second area.

The description with respect to the circuit area is merely an example, and it may be variously arranged and designed according to the design of the first area 311, the circuit area, and the second area.

In the embodiment illustrated in FIG. 3, it may be seen that the first area 311 is circular. However, the shape of the first area 311 is not limited thereto, and the under-display camera area may be formed in an oval or polygonal shape.

In an embodiment, the camera 201 may be disposed at the lower portion of the rear cover 160. The camera 201 may be disposed on the rear surface (e.g., a surface facing +z direction) of a third area 313 of the rear cover 160 to face the rear direction (e.g., −z direction) of the electronic device 100. The third area 313 of the rear cover 160 may include a material having high transparency. The third area 313 of the rear cover 160 may have higher transparency than a fourth area of the rear cover 160. The fourth area may be another area of the rear cover 160 other than the third area 313. For example, the third area 313 may be constituted of a glass material.

Figure 4:
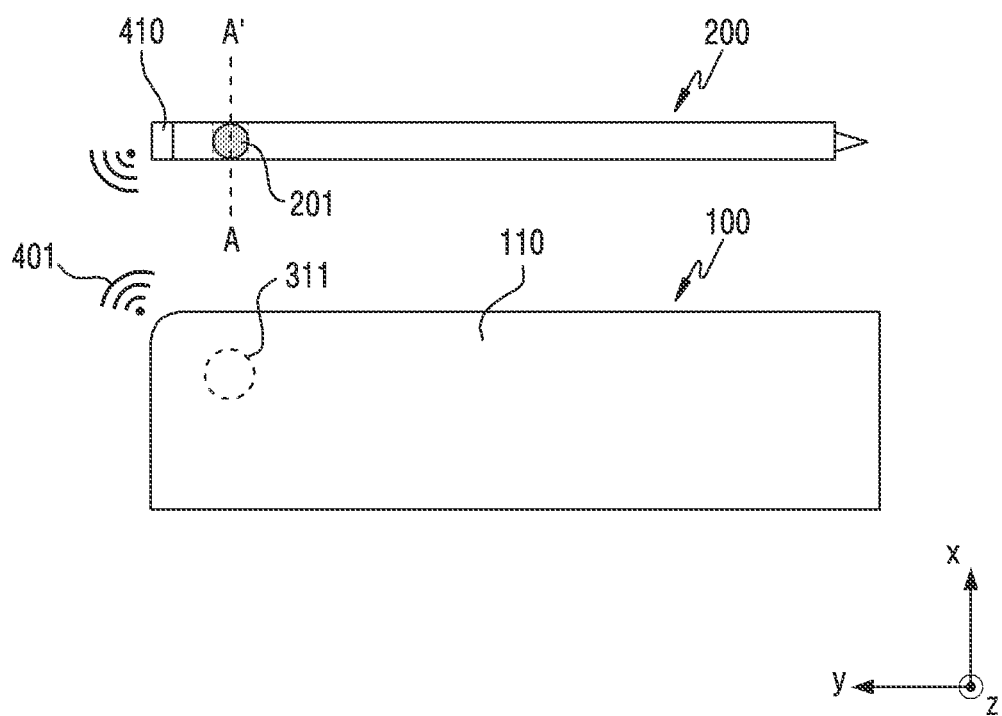
FIG. 4 shows an electronic device and an external device establishing a wireless communication connection with the electronic device according to an embodiment of the disclosure.

FIG. 4 shows an electronic device and an external device establishing a wireless communication connection with the electronic device according to an embodiment of the disclosure.

Referring to FIG. 4, the electronic device 100 may establish a wireless communication connection with the external device 200. The electronic device 100 may establish a wireless communication connection 401 with the external device 200 by using a first wireless communication circuit 103. The electronic device 100 may identify the external device 200 and establish a wireless communication connection 401 with the identified external device 200.

In an embodiment, the electronic device 100 may identify an external device to be connected, which is available or within a connectible range by using at least one positioning technology. The electronic device 100 may scan to identify whether the external device 200 mapped to be connected to the electronic device 100 is within a connectible range, based on a received signal strength indication (RSSI) magnitude and an ultra-wideband (UWB) wireless communication technology. The electronic device 100 and/or the external device 200 may support the ultra-wideband (UWB) function, and the electronic device 100 may measure a distance and direction of the external device 200 to be connected through the ultra-wideband (UWB) function.

The electronic device 100 may identify the external device 200 through the scan operation, and detect a distance and direction of the identified external device 200 through the UWB communication so as to filter the identified external device 200. The electronic device 100 may establish, based on the identified distance and direction, the wireless communication connection 401 with an available external device (e.g., a device within a predetermined distance and predetermined direction from the electronic device 100) among external devices 200 of which existence is identified. For example, when the electronic device 100 establishes a wireless communication connection with the external device 200, the wireless communication connection may be established by identifying an electronic pen within a first distance which falls in a connectible range.

The electronic device 100 may establish a wireless communication connection with the external device 200 regardless of the position of the external device 200 when the external device 200 is inserted into the electronic device 100. For example, the electronic device 100 may detect that the external device 200 is inserted into the electronic device 100 through at least one sensor and establish a wireless communication connection with the external device 200 in response to the detection. When the insertion of the external device 200 is detected, the electronic device 100 may automatically establish a wireless communication connection with the external device 200. The "automatically" may be understood as "without a user input".

When it is detected that the external device 200 is detached from the electronic device 100, the electronic device 100 may release a wireless communication connection from the external device 200. For example, when it is detected that the external device 200 is separate in the inserted state, the electronic device 100 may release a wireless communication connection from the external device 200. The electronic device 100 may maintain a wireless communication connection regardless of detachment of the external device 200 from the electronic device 100. Whether to establish or release wireless communication by the attachment or detachment of the external device 200 may be changed according to the configuration environment of the electronic device 100.

When separated from the external device 200, the electronic device 100 may establish a wireless communication connection with the external device 200. The electronic device 100 may establish a wireless communication connection with the external device 200 in response to an input for establishing a wireless communication connection with the external device 200. The electronic device 100 may establish a wireless communication connection with the external device 200 when a user input with respect to a scan function of the external device 200 and a connection function to the external device 200 is received.

The external device 200 may have at least one button. For example, the external device 200 may include a first button 410 for driving the camera 201 to photograph an image. For another example, the external device 200 may include a button for establishing a communication connection with the electronic device 100.

In the embodiment illustrated in FIG. 4, the first button 410 may be disposed at a distal end of the external device 200. For example, the external device 200 (e.g., an electronic pen) may include a pen point at a first distal end and the first button 410 at a second distal end. The first button 410 may be a physical button or a touch-type button using a touch sensor.

The electronic device 100 may transmit or receive data to or from the external device 200 based on the established wireless communication connection 401. For example, the electronic device 100 may receive image data obtained through the camera 201 by the external device 200.

Figure 5A:
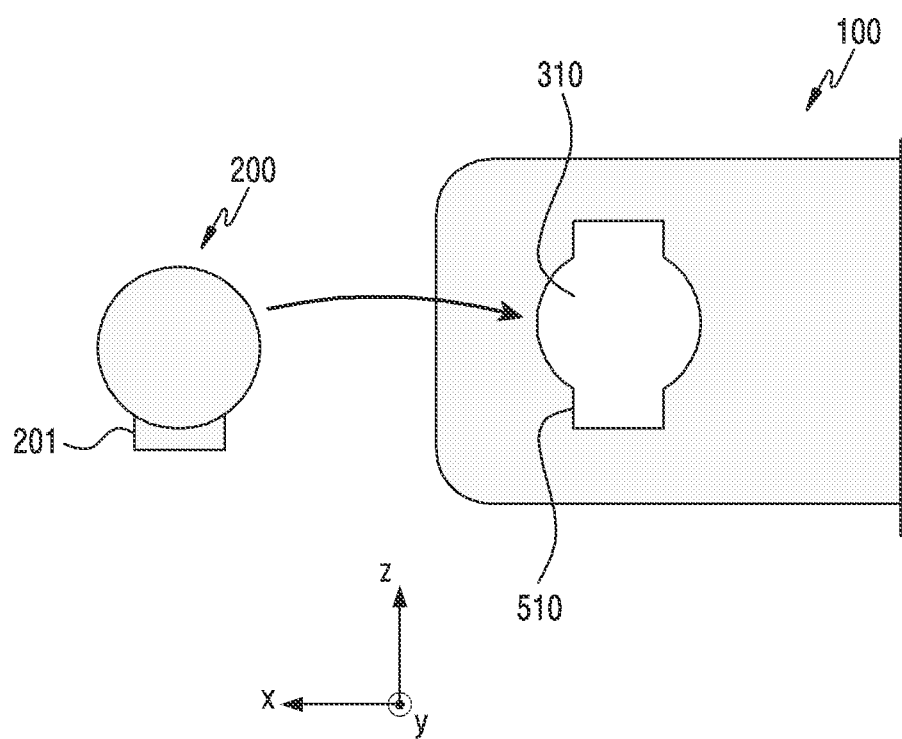
FIG. 5A shows an opening of an electronic device and a section of an external device according to an embodiment of the disclosure.
Figure 5B:
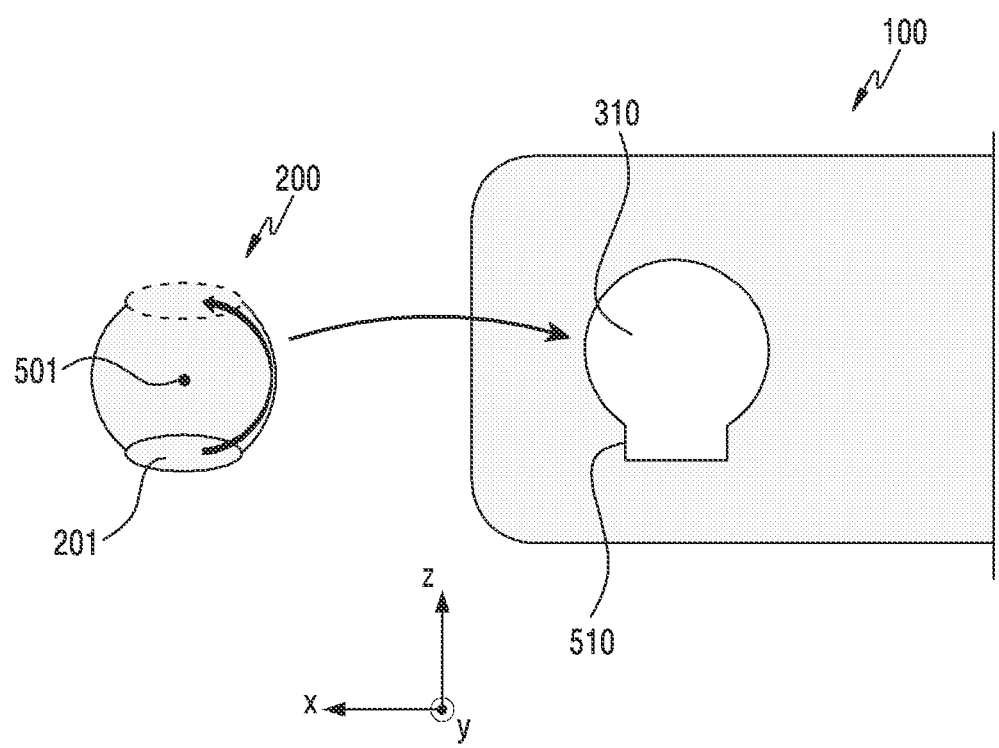
FIG. 5B shows an opening of an electronic device and a section of an external device according to an embodiment of the disclosure.

FIG. 5A shows an opening 310 of an electronic device 100 and a section of an external device 200 according to an embodiment of the disclosure. FIG. 5B shows an opening 310 of an electronic device 100 and a section of an external device 200 according to an embodiment of the disclosure. The section of the external device 200 may be a section of the external device 200 in FIG. 4 taken along A-A'.

Referring to FIG. 5A, the opening 310 of the electronic device 100 and/or an internal space extending from the opening into the electronic device 100 may include at least one groove 510. The internal space may be called or referred to as an insertion space. The groove 510 may be a space for the camera 201 of the external device 200 to be inserted into the opening or the internal space. The groove 510 may face the front direction (e.g., +z direction) of the electronic device 100. The groove 510 may face the rear direction (e.g., −z direction) of the electronic device 100. The groove may be referred to as a protrusion or a fixation part.

In an embodiment, the groove 510 may be a guide groove for the external device 200 (e.g., an electronic pen) to be steadily inserted. For example, when the external device 200 is inserted through the opening 310 of the electronic device 100, the groove may be a guide groove for allowing the external device 200 to be inserted without rotation while maintaining the direction in which the insertion was initiated.

The groove 510 may fix the external device 200 in a state of being inserted into the electronic device 100. For example, the groove 510 may fix the camera 201 to face the front or rear of the electronic device 100 in a state in which the external device 200 is inserted into the electronic device 100. The camera 201 of the external device 200 may be fixed while being inserted to face the front direction (e.g., +z direction) of the electronic device 100. For example, the shape of the opening 310 including the groove 510 may correspond to a structure for preventing the external device 200 from wobbling or rotating in the insertion space in an inserted state of external device 200.

Referring to FIG. 5B, in unlike FIG. 5A, the camera 201 of the external device 200 may be inserted inside the external device 200 so as not to protrude or not to be exposed outside the external device 200.

Referring to FIG. 5B, the camera 201 of the external device 200 may rotate. The camera 201 of the external device 200 may rotate 360 degrees about a center axis 501 of the external device 200 rather than being fixed. The camera 201 may rotate in response to an input for a direction change of the camera. For example, the external device 200 may include at least one button, the direction of the camera 201 may be changed by pressing or touching (e.g., a single touch or double touch).

Figure 6:
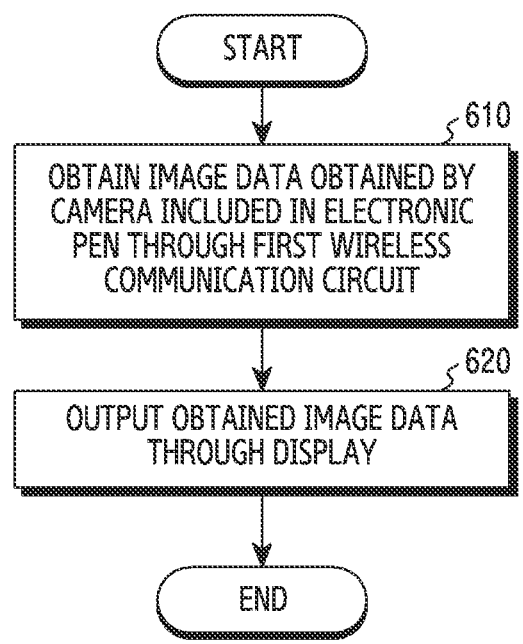
FIG. 6 shows a process in which an electronic device outputs image data through a display according to an embodiment of the disclosure.

FIG. 6 shows a process in which an electronic device 100 outputs image data through a display according to an embodiment of the disclosure.

Referring to FIG. 6, it is described that operations are performed by the electronic device 100, but they may be understood to be performed by the processor 101 of the electronic device 100.

In operation 610, the electronic device 100 may obtain, through the first wireless communication circuit, image data obtained by the camera included in an electronic pen. Hereinafter, the "image data obtained by the camera included in the electronic pen" may be understood as "image data obtained by the camera of the electronic pen" and/or "image data obtained by the electronic pen".

The electronic device 100 may obtain, through the first wireless communication circuit, image data obtained through the electronic pen regardless of the position and direction of the electronic pen. For example, image data obtained by the electronic pen outside the electronic device 100 may be obtained through the first wireless communication circuit. The electronic device 100 may obtain, through the first wireless communication circuit, image data obtained by the electronic pen while the electronic pen is mounted to the electronic device 100.

The electronic device 100 may establish a wireless communication connection with the electronic pen. The electronic device 100 may receive data (e.g., image data) from the electronic pen with an established wireless communication connection. The electronic device 100 may transmit data to the electronic pen with an established wireless communication connection.

The electronic device 100 may perform image processing with respect to the obtained image data through the image signal processor (ISP) or the processor. The electronic device 100 may store the image data on which imaging processing has been performed in at least one memory of the electronic device 100.

In operation 620, the electronic device 100 may output the obtained image data through a display (e.g., the display 110 in FIG. 1). The electronic device 100 may output the image data on which imaging processing has been performed through the display 110. The electronic device 100 may output, through the display 110, the image data on which imaging processing has been performed to be stored in the memory.

Figure 7:
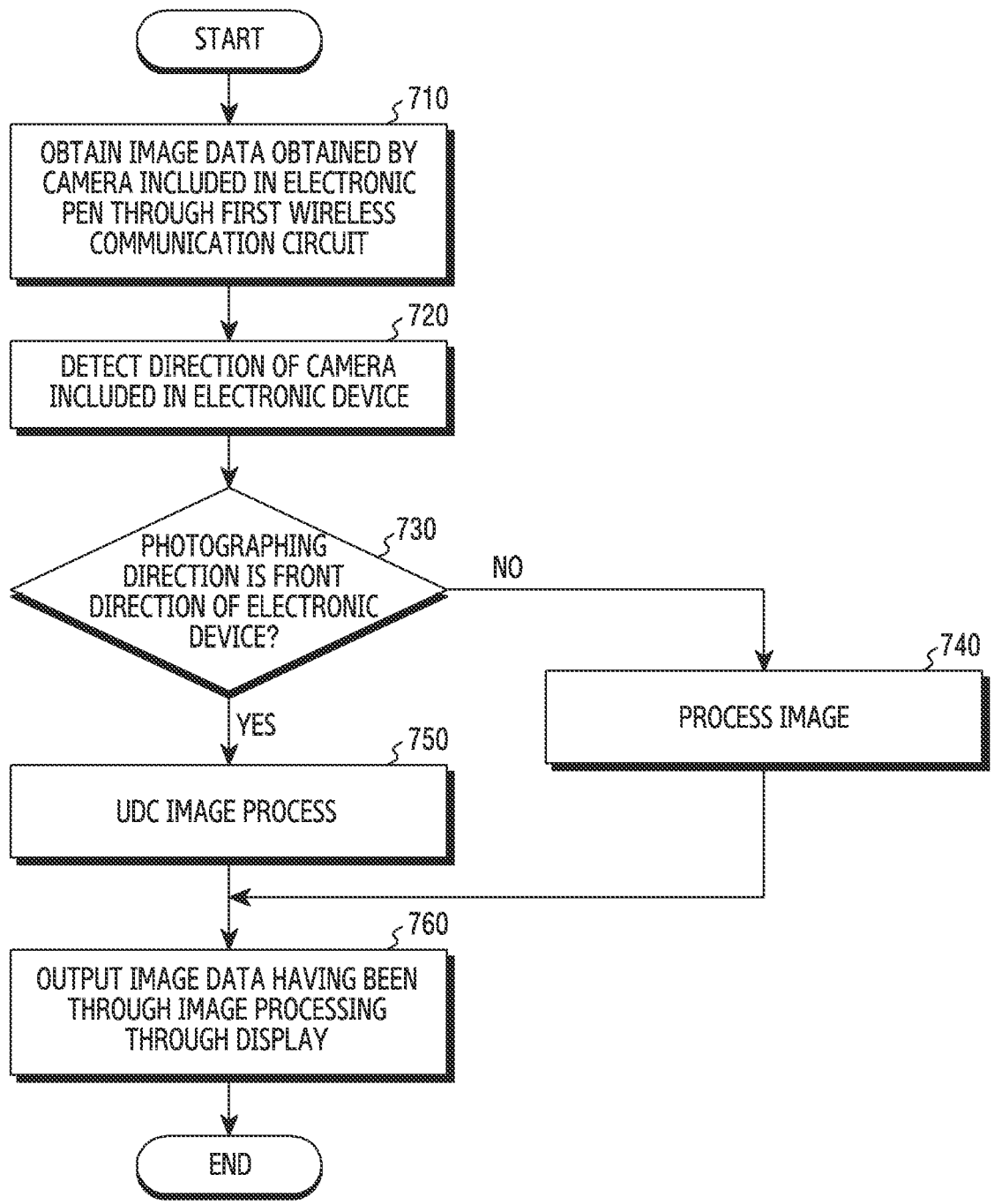
FIG. 7 shows a process in which obtained image data is processed based on a photographing direction of a camera in an electronic device according to an embodiment of the disclosure.

FIG. 7 shows a process in which obtained image data is processed based on a photographing direction of a camera in an electronic device according to an embodiment of the disclosure.

Referring to FIG. 7, it is described that operations shown in FIG. 7 are performed by the electronic device 100, but they may be understood to be performed by the processor 101 of the electronic device 100. In embodiments hereinafter, the order of operations may be altered or at least two operations may be concurrently performed. For example, the electronic device 100 may obtain image data (operation 710) after detecting the direction of the camera 201 (operation 720).

In operation 710, the electronic device 100 may obtain, through the first wireless communication circuit, image data obtained by the camera 201 included in the electronic pen. Operation 710 may correspond to operation 610 in FIG. 6.

In operation 720, the electronic device 100 may detect the direction of the camera 201 included in the electronic pen. The electronic device 100 may detect the photographing direction of the camera 201 through at least one sensor. The electronic device 100 may determine whether the image data is image data generated by being photographed through the display 110 or image data generated by being photographed through a transparent area of the rear cover of the electronic device 100. The electronic device 100 may determine whether the image data is image data obtained while the electronic pen is inserted into the electronic device 100 or image data obtained in a state in which the electronic pen is detached from the electronic device.

The electronic device 100 may determine whether the electronic pen is inserted. The electronic device 100 may determine whether the electronic pen is inserted or attached, by using at least one sensor (e.g., a proximity sensor or geomagnetic sensor). The electronic device 100 may determine in which direction the electronic pen is inserted. The electronic device 100 may determine in which direction the electronic pen is inserted, by using at least one sensor (e.g., a proximity sensor or geomagnetic sensor). For example, the electronic device 100 may determine the insertion direction of the electronic pen based on a hall voltage obtained through a coil or a hall sensor positioned in a portion of the internal space into which the electronic pen is inserted.

The electronic device 100 may analyze the photographed image data to detect the photographing direction of the camera 201. For example, the electronic device 100 may receive image data photographed by the camera 201 and analyze the image data. The electronic device 100 may analyze the received image data and identify whether the direction of the camera 201 is directed to the front of the electronic device 100 or the rear of the electronic device 100. The electronic device 100 may detect the photographing direction of the camera by analyzing elements such as light bleed, brightness, and/or transparency of the obtained image.

In operation 730, the electronic device 100 may determine whether the photographing direction of the camera 201 is directed to the front of the electronic device 100. When the photographing direction of the camera 201 is directed to the rear direction of the electronic device 100 or the camera 201 is separated from the electronic device 100 to photograph, the electronic device 100 may perform operation 740. When the photographing direction of the camera 201 is directed to the front direction of the electronic device 100, the electronic device 100 may perform operation 750.

In operation 740, the electronic device 100 may perform image processing with respect to the obtained image data. The electronic device 100 may perform image processing with respect to electrically converted image data. The electronic device 100 may perform various image processing such as 3A processing, lens shading correction, edge enhancement, dead pixel correction. The 3A may include at least one of auto white balance (AWB), auto exposure (AE), and auto focusing (AF). In addition, the electronic device 100 may perform at least one of noise removal, tone curve adjustment, and demosaic.

The electronic device 100 may store the image data obtained after image processing has been performed in at least one memory (e.g., a display buffer) of the electronic device 100.

In operation 750, the electronic device 100 may perform UDC image processing with respect to the obtained image data. When the electronic device photographs the front direction of the electronic device 100 while being inserted into the electronic device 100, it may be photographed by an under-display camera (UDC) and thus the electronic device 100 may perform UDC image processing. The image processing performed in operation 750 may be a process including image processing performed in operation 740. For example, in operation 750, the electronic device 100 may perform the image processing operations described with reference to operation 740, and in addition thereto, may perform a multi-frame synthesis for SNR enhancement, and image recovery processing for resolution enhancement and light bleed reduction.

In operation 760, the electronic device 100 may output, through the display 110, the image data having been through the image processing. Operation 760 may correspond to operation 620 in FIG. 6.

Figure 8:
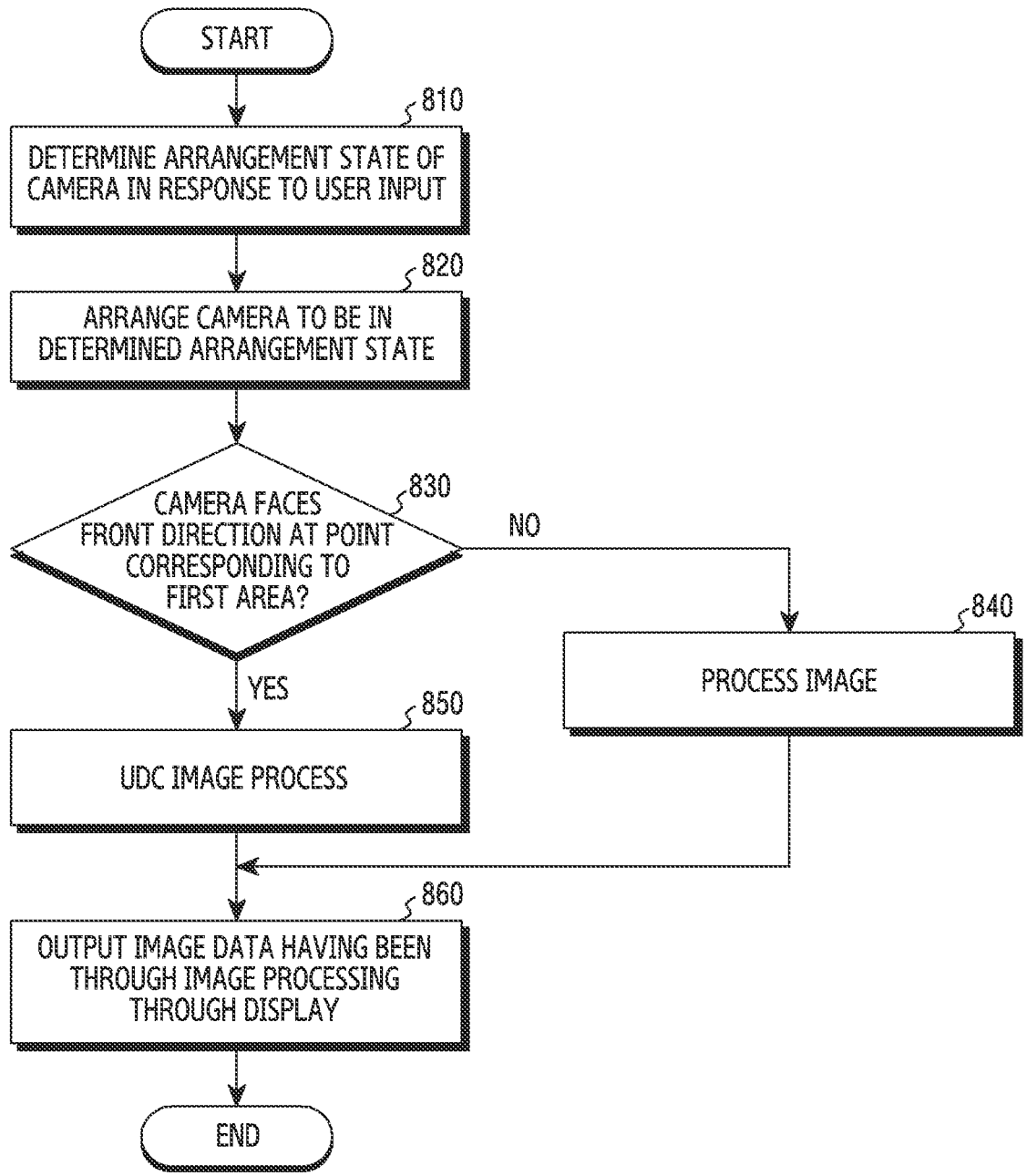
FIG. 8 shows a process in which obtained image data is processed based on an arrangement state of a camera in an electronic device according to an embodiment of the disclosure.

FIG. 8 shows a process in which obtained image data is processed based on an arrangement state of a camera 201 in an electronic device 100 according to an embodiment of the disclosure.

Referring to FIG. 8, it is described that operations are performed by the electronic device 100, but the operations may be understood to be performed by the processor 101 of the electronic device 100. In embodiments hereinafter, the order of operations may be altered or at least two operations may be concurrently performed.

In operation 810, the electronic device 100 may determine an arrangement state of the camera 201 included in the electronic pen in response to a user input.

The camera 201 included in the electronic pen may be changed as the arrangement state of the electronic pen. Hereinafter, although a description is given focusing on the position of the camera 201 and the direction in which the camera 201 face, the description may be understood to correspond to the position of the electronic pen including the camera 201 and the direction in which the electronic pen faces.

A user input may be an input that a user intends to physically move the camera 201. The user input may be an input performed by a user in an electrical/communicational manner so that the processor 101 of the electronic device 100 may move the camera 201.

The arrangement state of the camera 201 may be a state related to the position and the direction in which the camera 201 faces.

The camera 201 may move horizontally with respect to the display 110. For example, the camera 201 may be positioned at a point corresponding to a first area (e.g., the first area 311) in the internal space of the electronic device 100 and may move to another point other than the point. The camera 201 may be positioned at a point not overlapping the display 110 by horizontally moving.

The camera 201 may rotate and move around one axis. For example, the camera 201 may rotate to face the first area (e.g., the first area 311) or the front direction in the internal space of the electronic device 100. For another example, the camera 201 may rotate to face an area opposite to the first area (e.g., the first area 311) or the rear direction.

The electronic device 100 may determine the arrangement state of the camera 201 included in the electronic pen in response to the user input under control of the processor 101.

In operation 820, the electronic device 100 may arrange the camera 201 included in the electronic pen to be in the determined arrangement state.

According to the control of the processor 101, the electronic device 100 may arrange the camera 201 included in the electronic pen to be in the arrangement state related to the position of the camera 201 and the direction in which the camera 201 faces.

In operation 830, the electronic device 100 may determine whether the camera 201 is directed to the front direction at a point corresponding to the first area.

The electronic device 100 may perform operation 840 when it is determined that the camera 201 is not directed to the front direction at a point corresponding to the first area.

The electronic device 100 may perform operation 850 when the electronic device 100 determined that the camera 201 is directed to the front direction at a point corresponding to the first area.

In operation 840, the electronic device 100 may perform image processing with respect to the obtained image data. The electronic device 100 may perform image processing with respect to electrically converted image data. The electronic device 100 may perform various image processing such as 3A processing, lens shading correction, edge enhancement, dead pixel correction. The 3A may include at least one of auto white balance (AWB), auto exposure (AE), and auto focusing (AF). In addition, the electronic device 100 may perform at least one of noise removal, tone curve adjustment, and demosaic.

The electronic device 100 may store the image data obtained after imaging processing has been processed in at least one memory (e.g., a display buffer) of the electronic device 100.

In operation 850, the electronic device 100 may perform UDC image processing with respect to the obtained image data. When the electronic pen photographs the front direction of the electronic device 100 while being inserted into the electronic device 100, it may be photographed by an under-display camera (UDC) and thus the electronic device 100 may perform UDC image processing. The image processing performed in operation 850 may be a process including image processing performed in operation 840. For example, in operation 850, the electronic device 100 may perform the image processing operations described with reference to operation 840, and in addition thereto, may perform a multi-frame synthesis for SNR enhancement, and image recovery processing for resolution enhancement and light bleed reduction.

In operation 860, the electronic device 100 may output, through the display 110, the image data having been through the image processing.

Figure 9:
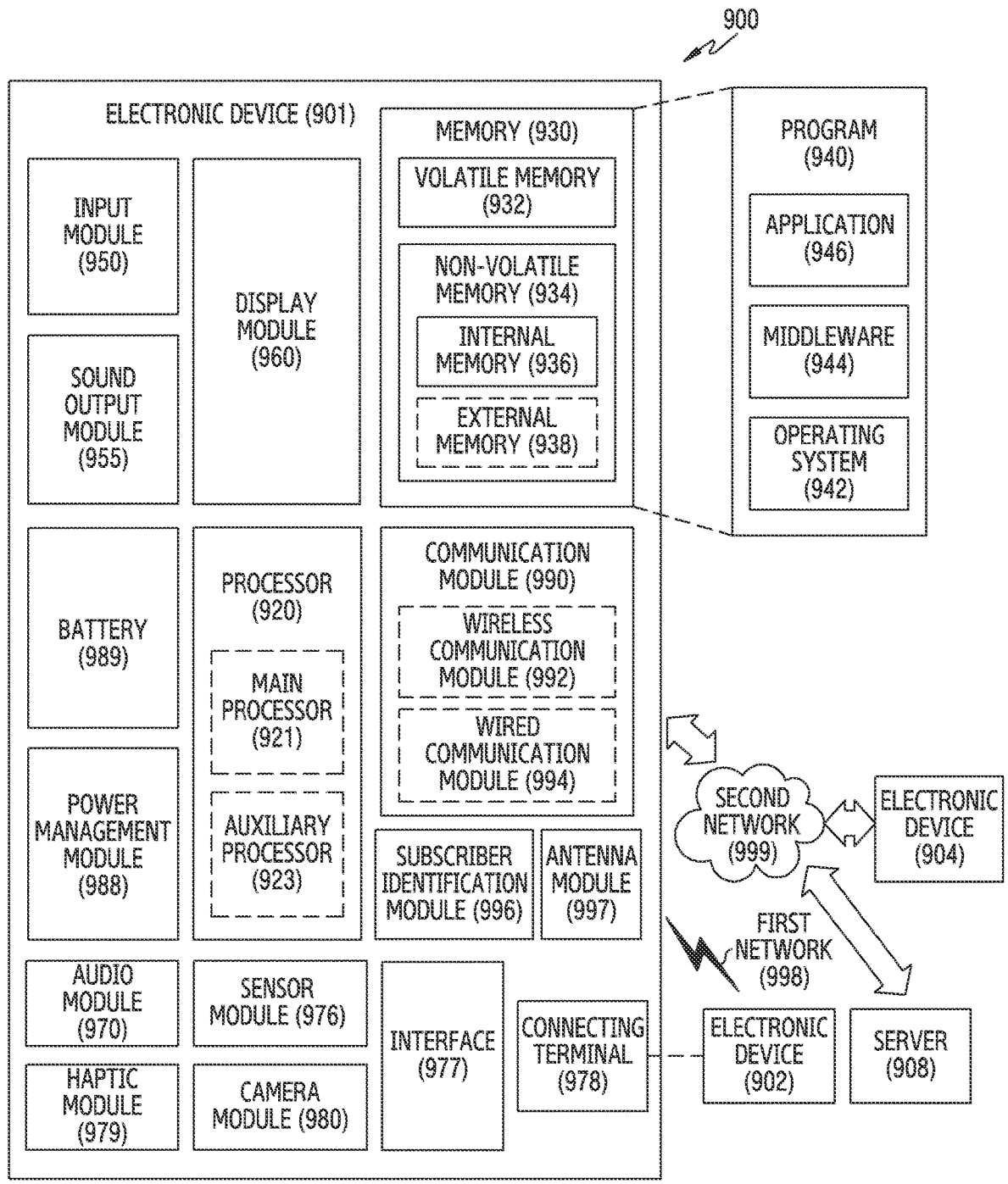
FIG. 9 is a block diagram illustrating an electronic device in a network environment according to an embodiment of the disclosure.

FIG. 9 is a block diagram illustrating an electronic device in a network environment according to an embodiment of the disclosure.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™ wireless-fidelity (Wi-Fi) direct, or infrared data association (IrDA)) or the second network 999 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
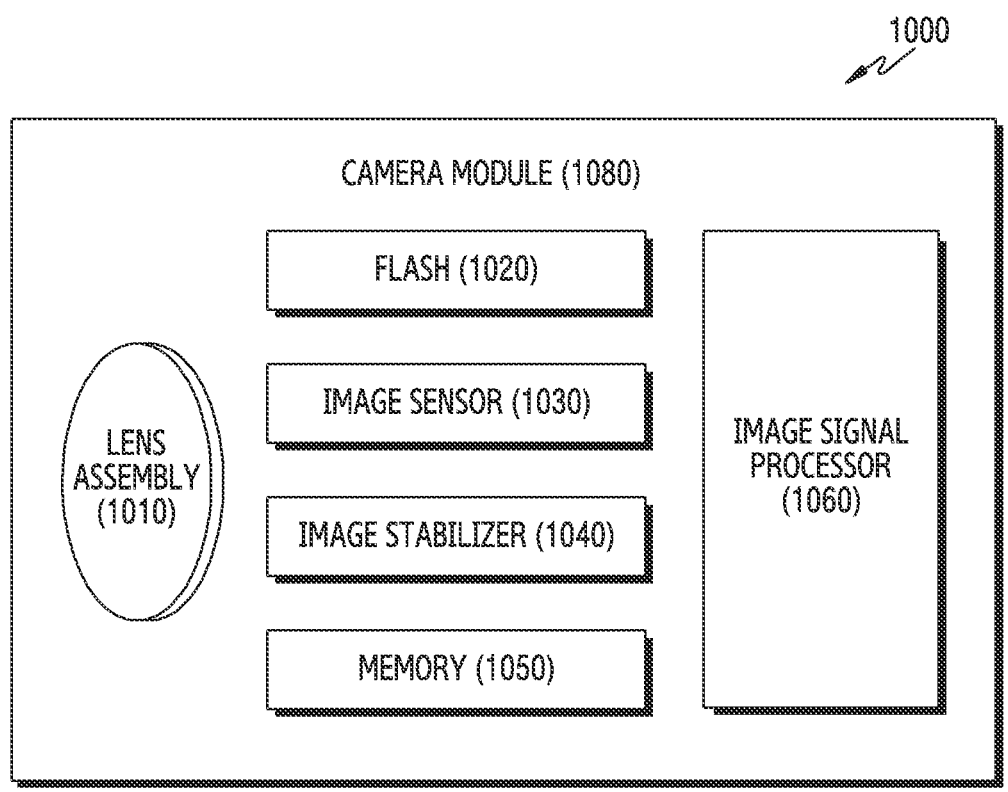
FIG. 10 is a block diagram illustrating the camera module according to an embodiment of the disclosure.

FIG. 10 is a block diagram 1000 illustrating a camera module according to an embodiment of the disclosure.

Referring to FIG. 10, the camera module 980 may include a lens assembly 1010, a flash 1020, an image sensor 1030, an image stabilizer 1040, memory 1050 (e.g., buffer memory), or an image signal processor 1060. The lens assembly 1010 may collect light emitted or reflected from an object whose image is to be taken. The lens assembly 1010 may include one or more lenses. The camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. The flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. The image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer.

The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display module 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may perform one or more image processing with respect to an image obtained via the image sensor 1030 or an image stored in the memory 1050. The one or more image processing may include depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display module 960, the electronic device 902, the electronic device 904, or the server 908) outside the camera module 980. The image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display module 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

The electronic device (e.g., the electronic device 100) may include a housing, the housing including an opening formed on a portion thereof and an internal space extending from the opening into the housing, a first wireless communication circuit (e.g., the first wireless communication circuit 103), a display (e.g., the display 110), light transmittance of a first area of the display (e.g., the display 110) having first transmittance and light transmittance of a second area which is an area other than the first area of the display (e.g., the display 110) having second transmittance lower than the first transmittance, an electronic pen (e.g., the external device 200) insertable into the internal space through the opening and including a camera (e.g., the camera 201) and a second wireless communication circuit (e.g., the second wireless communication circuit 203), the camera (e.g., the camera 201) of the electronic pen (e.g., the external device 200) being positioned at a point corresponding to the first area of the display (e.g., the display 110) when the electronic pen (e.g., the external device 200) is inserted into the internal space of the housing, and at least one processor (e.g., the processor 101) operatively connected to the first wireless communication circuit (e.g., the first wireless communication 103), the display (e.g., the display 110) and the electronic pen (e.g., the external device 200), wherein the at least one processor (e.g., the processor 101) obtains image data obtained by the camera (e.g., the camera 201) included in the electronic pen (e.g., the external device 200) through the first wireless communication circuit (e.g., the first wireless communication circuit 103) and outputs the obtained image data through the display (e.g., the display 110).

The electronic device (e.g., the electronic device 100) may include a first charging circuit (e.g., the first wireless charging circuit 105) disposed inside the housing and charge, through the first charging circuit (e.g., the first wireless charging circuit 105), the electronic pen (e.g., the external device 200) including a second charging circuit (e.g., the second wireless charging circuit 205) capable of being electromagnetically coupled to the first charging circuit (e.g., the first wireless charging circuit 105).

A pixel density of the first area of the display (e.g., the display 110) may have a first density and a pixel density of the second area of the display (e.g., the display 110) may have a second density higher than the first density.

The electronic device (e.g., the electronic device 100) may include a rear cover, wherein light transmittance of a third area of the rear cover has third transmittance, light transmittance of a fourth area which is an area other than the third area of the rear cover has fourth transmittance lower than the third transmittance, and the third area is formed at a position corresponding to the first area.

The at least one processor (e.g., the processor 101) may determine a direction in which the electronic pen (e.g., the external device 200) is inserted, through at least one sensor (e.g., the sensor 143).

The at least one processor (e.g., the processor 101) may analyze the obtained image data and determine, based on the analysis, whether the obtained image data is image data generated while the electronic pen (e.g., the external device 200) is inserted into the electronic device (e.g., the electronic device 100) or image data generated outside the electronic device (e.g., the electronic device 100).

The at least one processor (e.g., the processor 101) may detect a photographing direction of the camera (e.g., the camera 201) of the electronic pen (e.g., the external device 200) in a state in which the electronic pen (e.g., the external device 200) is inserted into the electronic device (e.g., the electronic device 100), perform first image processing with respect to the obtained image data when the photographing direction of the camera (e.g., the camera 201) is directed to the rear direction of the electronic device (e.g., the electronic device 100), and perform first image processing and second image processing with respect to the obtained image data when the photographing direction of the camera (e.g., the camera 201) is directed to the front direction of the electronic device (e.g., the electronic device 100).

The internal space may include a groove for preventing the electronic pen (e.g., the external device 200) from rotating in an inserted state.

The groove may extend from the opening by a first length and the first length may include a distance from the opening to the first area.

The electronic device (e.g., the electronic device 100) may include a first groove for the camera (e.g., the camera 201) of the electronic pen (e.g., the external device 200) to be inserted facing a first direction and a second groove for the camera (e.g., the camera 201) of the electronic pen (e.g., the external device 200) to be inserted facing a second direction opposite to the first direction.

The operation method may include an operation of obtaining image data obtained by a camera (e.g., the camera 201) included in an electronic pen (e.g., the external device 200) through a first wireless communication circuit (e.g., the first wireless communication circuit 103) and an operation of outputting the obtained image data through a display (e.g., the display 110).

The operation method may include an operation of analyzing the obtained image data and an operation of determining, based on the analysis, whether the obtained image data is image data generated while the electronic pen (e.g., the external device 200) is inserted into the electronic device (e.g., the electronic device 100) or image data generated outside the electronic device (e.g., the electronic device 100).

The operation method may include an operation of determining a direction in which the electronic pen (e.g., the external device 200) is inserted, through at least one sensor (e.g., the sensor 143).

The operation method may include an operation of detecting a photographing direction of the camera (e.g., the camera 201) of the electronic pen (e.g., the external device 200) in a state in which the electronic pen (e.g., the external device 200) is inserted into the electronic device (e.g., the electronic device 100), and an operation of performing first image processing with respect to the obtained image data when the photographing direction of the camera (e.g., the camera 201) is directed to the front direction of the electronic device (e.g., the electronic device 100), and an operation of performing second image processing with respect to the obtained image data when the photographing direction of the camera (e.g., the camera 201) is directed to the rear direction of the electronic device (e.g., the electronic device 100).

The electronic device (e.g., the electronic device 100) may include a first groove for the camera (e.g., the camera 201) of the electronic pen (e.g., the external device 200) to be inserted facing a first direction and a second groove for the camera (e.g., the camera 201) of the electronic pen (e.g., the external device 200) to be inserted facing a second direction opposite to the first direction.

The electronic device (e.g., the electronic device 100) may include a display (e.g., the display 110), light transmittance of a first area of the display (e.g., the display 110) having first transmittance and light transmittance of a second area which is an area other than the first area of the display (e.g., the display 110) having second transmittance lower than the first transmittance, a camera (e.g., the camera 201) movable in the electronic device (e.g., the electronic device 100), the camera (e.g., the camera 201) being positioned at a point corresponding to the first area, and at least one processor (e.g., the processor 101) operatively connected to the display (e.g., the display 110) and the camera (e.g., the camera 201), wherein the at least one processor (e.g., the processor 101) determines an arrangement state of the camera (e.g., the camera 201) in response to a user input of the electronic device (e.g., the electronic device 100), arranges the camera (e.g., the camera 201) to be in the arrangement state based on the determination, and outputs image data obtained by the camera (e.g., the camera 201) through the display (e.g., the display 110).

The arrangement state may include at least a photographing direction of the camera (e.g., the camera 201) and the at least one processor (e.g., the processor 101) may arrange the camera (e.g., the camera 201) to face the front direction of the electronic device (e.g., the electronic device 100) or arrange the camera (e.g., the camera 201) to face the rear direction of the electronic device (e.g., the electronic device 100), based on the determination.

The camera (e.g., the camera 201) may rotate around one axis or move horizontally with respect to the display (e.g., the display 110) and the at least one processor (e.g., the processor 101) may photograph the front direction or the rear direction of the electronic device (e.g., the electronic device 100) according to the rotation or the horizontal movement of the camera (e.g., the camera 201).

The at least one processor (e.g., the processor 101) may perform first image processing with respect to the obtained image data when it is determined that the camera (e.g., the camera 201) is arranged not to face the front direction at a point corresponding to the first area and perform the first image processing and second image processing with respect to the obtained image data when it is determined the camera (e.g., the camera 201) is arranged to face the front direction at a point corresponding to the first area.

The second image processing may include at least one of multi-frame synthesis, image resolution enhancement processing, or image recovery processing for light bleed reduction.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 840) including one or more instructions that are stored in a storage medium (e.g., the internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may also be separately disposed in another element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing including:
        an opening formed on a portion thereof, and
        an internal space extending from the opening into the housing;
    a first wireless communication circuit;
    a display including:
        a first area having a first light transmittance, and
        a second area other than the first area of the display and having a second light transmittance lower than the first transmittance;
    an electronic pen insertable into the internal space through the opening and including:
        a camera being positioned at a point corresponding to the first area of the display when the electronic pen is inserted into the internal space of the housing, and
        a second wireless communication circuit, the camera of the electronic pen; and
    at least one processor operatively connected to the first wireless communication circuit, the display, and the electronic pen,
    wherein the at least one processor is configured to:
        obtain image data obtained by the camera included in the electronic pen through the first wireless communication circuit,
        output the obtained image data through the display,
        analyze the obtained image data, and
        determine, based on the analysis, whether the obtained image data is image data generated while the electronic pen is inserted into the electronic device or image data generated outside the electronic device.

2. The electronic device of claim 1,
    wherein the electronic device comprises a first charging circuit disposed inside the housing, and wherein the processor is further configured to control the first charging circuit to charge, through the first charging circuit, the electronic pen including a second charging circuit included in the electronic pen and capable of being electromagnetically coupled to the first charging circuit.

3. The electronic device of claim 1, wherein a pixel density of the first area of the display has a first density and a pixel density of the second area of the display has a second density higher than the first density.

4. The electronic device of claim 1,
wherein the electronic device comprises a rear cover,
wherein a third area of the rear cover has a third light transmittance, and a fourth area other than the third area of the rear cover has a fourth light transmittance lower than the third light transmittance, and
wherein the third area is formed at a position corresponding to the first area.

5. The electronic device of claim 1, wherein the at least one processor is further configured to determine a direction in which the electronic pen is inserted, through at least one sensor.

6. The electronic device of claim 1, wherein the at least one processor is further configured to:
detect a photographing direction of the camera of the electronic pen in a state in which the electronic pen is inserted into the electronic device,
perform first image processing with respect to the obtained image data when the photographing direction of the camera is directed to a rear direction of the electronic device, and
perform first image processing and second image processing with respect to the obtained image data when the photographing direction of the camera is directed to a front direction of the electronic device.

7. The electronic device of claim 1, wherein the internal space comprises a groove for preventing the electronic pen from rotating while inserted in the internal space.

8. The electronic device of claim 7,
wherein the groove extends from the opening by a first length, and
wherein the first length comprises a distance from the opening to the first area.

9. The electronic device of claim 1, wherein the electronic device further comprises:
a first groove for the camera of the electronic pen to be inserted facing a first direction; and
a second groove for the camera of the electronic pen to be inserted facing a second direction opposite to the first direction.

10. A method for operating an electronic device, the method comprising:
obtaining image data obtained by a camera included in an electronic pen through a first wireless communication circuit;
outputting the obtained image data through a display;
analyzing the obtained image data; and
determining, based on the analyzing, whether the obtained image data is image data generated while the electronic pen is inserted into the electronic device or image data generated outside the electronic device.

11. The method of claim 10, further comprising:
determining a direction in which the electronic pen is inserted, through at least one sensor.

12. The method of claim 10, further comprising:
detecting a photographing direction of the camera of the electronic pen in a state in which the electronic pen is inserted into the electronic device;
performing first image processing with respect to the obtained image data when the photographing direction of the camera is directed to a front direction of the electronic device; and
performing second image processing with respect to the obtained image data when the photographing direction of the camera is directed to a rear direction of the electronic device.

13. The method of claim 10, wherein the electronic device comprises:
a first groove for the camera of the electronic pen to be inserted facing a first direction; and
a second groove for the camera of the electronic pen to be inserted facing a second direction opposite to the first direction.

14. An electronic device comprising:
a display including:
a first area having a first light transmittance, and
a second area other than the first area of the display, having a second light transmittance lower than the first light transmittance;
a camera movable in the electronic device, the camera being positioned at a point corresponding to the first area; and
at least one processor operatively connected to the display and the camera,
wherein the at least one processor is configured to:
determine an arrangement state of the camera in response to a user input of the electronic device,
arrange the camera to be in the arrangement state based on the determination,
output image data obtained by the camera through the display,
perform first image processing with respect to the obtained image data when it is determined that the camera is arranged not to face a front direction at a point corresponding to the first area, and
perform the first image processing and second image processing with respect to the obtained image data when it is determined the camera is arranged to face the front direction at a point corresponding to the first area.

15. The electronic device of claim 14,
wherein the arrangement state comprises at least a photographing direction of the camera, and
wherein the at least one processor is further configured to:
arrange the camera to face a front direction of the electronic device, or
arrange the camera to face a rear direction of the electronic device, based on the determination.

16. The electronic device of claim 14,
wherein the camera is capable of rotating around one axis or moving horizontally with respect to the display, and
wherein the at least one processor is further configured to:
photograph a front direction or photographs a rear direction of the electronic device according to the rotation or a horizontal movement of the camera.

17. The electronic device of claim 14, wherein the second image processing comprises at least one of multi-frame synthesis, image resolution enhancement processing, or image recovery processing for light bleed reduction.

* * * * *